United States Patent Office 2,920,095
Patented Jan. 5, 1960

2,920,095

TRIS(TRIALKOXYSILYLPROPYL) AMINES

Victor B. Jex, Clarence, and Donald L. Bailey, Snyder, N.Y., assignors to Union Carbide Corporation, a corporation of New York No Drawing. Application February 24, 1958
Serial No. 716,841

3 Claims. (Cl. 260—448.8)

This invention relates to new tertiary amines containing silicon chemically combined therein. More particularly, this invention relates to tris(alkoxysilylpropyl) amines which can be represented by the formula:

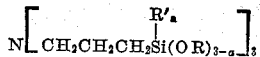

where R is an alkyl group, R' is hydrogen, aryl, or alkyl, and $a$ is an integer from 0 to 2. Examples of alkyl groups which R and R' represent include methyl, ethyl, propyl, butyl, pentyl, hexyl, and the like. Examples of aryl groups represented by R' include phenyl and naphthyl. Typical of our novel amines are tris(triethoxysilylpropyl)amine, tris(trimethoxysilylpropyl)amine, tris(diethoxymethylsilylpropyl)amine, tris(tripropoxysilylpropyl)amine, tris(diethoxyphenylsilylpropyl)amine, tris(ethoxydimethylsilylpropyl)amine, and the like. Thus, the tertiary trifunctional silylpropyl amines represented by the formula:

$$N[CH_2CH_2CH_2Si(OR)_3]_3$$

where R is as previously defined, are included.

The new compounds of this invention have been found to be useful as finishes for fibrous glass materials prior to the preparation of reinforced plastics therefrom. We have found that reinforced plastics, such as laminates, prepared from fibrous glass materials and thermosetting resins which comprise the aldehyde condensation resins, the epoxy resins and the urethane resins, having a superior glass-to-resin bond are produced by subjecting the fibrous glass materials, prior to lamination, to a treatment with a compound of the type described herein.

A particularly desirable property of the new compounds of this invention is their ability to form stable solutions with aqueous organic admixtures or with water. Consequently, these compounds make possible the finishing of fibrous glass materials without the necessity of employing costly anhydrous organic solvents which are in many cases flammable. When the amines of this invention are dissolved in water or in aqueous admixtures of organic compounds, the alkoxy groups are hydrolyzed and subsequently condensed to soluble polysiloxanes. The polysiloxanes thus formed can be represented by the formula:

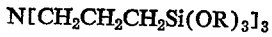

and include trifunctional siloxanes which are represented by the formula:

$$N[CH_2CH_2CH_2SiO_{3/2}]_3$$

where R' and $a$ are as previously defined.

The compounds of this invention are prepared by the reaction of a gamma-chloropropylalkoxysilane with ammonia, under pressure, at elevated temperatures. The reaction which takes place is illustrated by the general equation:

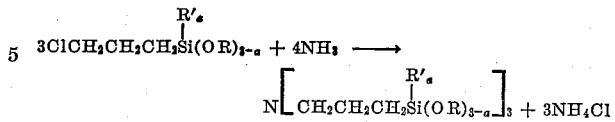

where R is alkyl, R' is hydrogen, alkyl, or aryl, and $a$ is an integer from 0 to 2.

The reaction by which the compounds of our invention are prepared is conducted in a suitable pressure vessel at temperatures of at least 90° C. and at pressures which are above atmospheric. The pressure employed may be autogenous or it may be applied by means of suitable equipment. Also formed in the reaction are mono- and bis(alkoxysilylpropyl)amines which can be separated from the tris(alkoxysilylpropyl)amines as by distillation. The proportions of the mono-, bis-, and tris(alkoxysilylpropyl)amines obtained by the reaction can be controlled by the use of varying amounts of ammonia. The smaller the mole fraction of ammonia based on the amount of gamma-chloropropylalkoxysilane in the reactants employed, the greater the proportion of the tris(alkoxysilylpropyl)amine in the product. A mole ratio of not more than 10 moles of ammonia per mole of gamma-chloropropylalkoxysilane is preferred in order to provide high yields of tris(alkoxysilylpropyl)amine.

This application is a continuation-in-part of application Serial No. 483,421, filed January 21, 1955, now U.S. Patent No. 2,832,754.

Example

To a 3-liter pressure vessel were charged 1.5 moles (365 grams) of gamma-chloropropyltriethoxysilane and 15 moles (255 grams) of liquid ammonia. The vessel was sealed and heated to a temperature of 100° C. for a period of 12 hours. After heating, the vessel was cooled to room temperature and the gaseous ammonia present in the vessel bled off. The residual products which consisted of a liquid and a white solid were removed from the vessel and filtered. The solid was then washed with anhydrous diethyl ether and discarded. The filtrate and washings were combined and fractionally distilled in a packed column under reduced pressure. Tris(triethoxysilylpropyl)amine was obtained in the fraction boiling at 200° to 205° C. (under 1 mm. mercury absolute pressure). The amount of tris(triethoxysilylpropyl)amine obtained represented a 14 percent yield based on the amount of starting gamma-chloropropyltriethoxysilane. The product had a refractive index $n_D^{25}$ of 1.4322 and a neutralization equivalent of 585.4.

What is claimed is:

1. An amine of the formula:

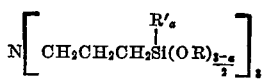

where R is alkyl, R' is from the class consisting of hydrogen, alkyl, and aryl, $a$ is an integer from 0 to 2.

2. Tris(trialkoxysilylpropyl)amine.

3. Tris(triethoxysilylpropyl)amine.

References Cited in the file of this patent

UNITED STATES PATENTS

| | | |
|---|---|---|
| 2,754,311 | Elliott | July 10, 1956 |
| 2,762,823 | Speier | Sept. 11, 1956 |
| 2,835,690 | Prober | May 20, 1958 |

FOREIGN PATENTS

| | | |
|---|---|---|
| 1,065,545 | France | Jan. 13, 1954 |

UNITED STATES PATENT OFFICE
CERTIFICATE OF CORRECTION

Patent No. 2,920,095                      January 5, 1960

Victor B. Jex et al.

It is hereby certified that error appears in the printed specification of the above numbered patent requiring correction and that the said Letters Patent should read as corrected below.

Column 1, lines 60 to 63, the formula should appear as shown below instead of as in the patent:

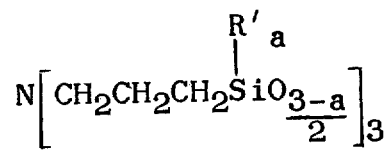

Signed and sealed this 4th day of April 1961.

(SEAL)
Attest:    ERNEST W. SWIDER

~~KARL H. AXLINE~~
Attesting Officer

ARTHUR W. CROCKER
                                      Acting Commissioner of Patents